US012655945B2

(12) United States Patent
Augusto et al.

(10) Patent No.: US 12,655,945 B2
(45) Date of Patent: Jun. 16, 2026

(54) INJECTOR FOR A GAS RESERVOIR, AND RESERVOIR EQUIPPED WITH SUCH AN INJECTOR

(71) Applicant: L'Air Liquide, Societe Anonyme pour l'Etude et l'Exploitation des Procedes Georges Claude, Paris (FR)

(72) Inventors: Angelo Augusto, Jouy-en-Josas (FR); Remi Gonin, Jouy-en-Josas (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 19/014,174

(22) Filed: Jan. 8, 2025

(65) Prior Publication Data

US 2025/0224079 A1 Jul. 10, 2025

(30) Foreign Application Priority Data

Jan. 8, 2024 (FR) ....................................... 2400140

(51) Int. Cl.
*F17C 13/04* (2006.01)
*F17C 5/00* (2006.01)
*F17C 13/00* (2006.01)

(52) U.S. Cl.
CPC ................ *F17C 13/04* (2013.01); *F17C 5/00* (2013.01); *F17C 13/002* (2013.01); (Continued)

(58) Field of Classification Search
CPC .......... F17C 5/00; F17C 13/00; F17C 13/002; F17C 13/04; F17C 2201/0109; (Continued)

(56) References Cited

U.S. PATENT DOCUMENTS 6,235,192 B1 * 5/2001 Melfi ................. B01D 53/0431 210/287
7,387,663 B2 * 6/2008 Watanabe .................. B01J 4/04 55/494

(Continued)

FOREIGN PATENT DOCUMENTS

AU 2022315500 A1 * 2/2024 .............. F17C 13/04
DE 10 2014 209916 11/2015
DE 10 2016 107146 10/2017

OTHER PUBLICATIONS

French Search Report for FR 2 400 140, mailed Jun. 26, 2024.

*Primary Examiner* — Nicolas A Arnett
(74) *Attorney, Agent, or Firm* — Elwood L. Haynes

(57) ABSTRACT

An injector for a gas reservoir, the injector having a duct designed to fluidically connect a filling station and the reservoir to be filled, the duct extending along a main axis and having an inlet orifice designed to receive a pressurized gas flow coming from the filling station and an outlet orifice designed to convey said flow towards the reservoir to be filled, also including a mobile member disposed inside the duct and designed to move relative to the outlet orifice, between a first extreme position in which the mobile member provides the outlet orifice with a minimum passage section, and a second extreme position in which the mobile member provides the outlet orifice with a maximum passage section.

13 Claims, 2 Drawing Sheets

(52) U.S. Cl.
CPC .. *F17C 2201/0109* (2013.01); *F17C 2205/03* (2013.01); *F17C 2205/0382* (2013.01); *F17C 2221/012* (2013.01); *F17C 2223/0123* (2013.01); *F17C 2260/023* (2013.01)

(58) Field of Classification Search
CPC .......... F17C 2205/03; F17C 2205/0305; F17C 2205/0382; F17C 2221/012; F17C 2223/0123; F17C 2260/023
See application file for complete search history.

(56) References Cited

U.S. PATENT DOCUMENTS

| | | | | |
|---|---|---|---|---|
| 8,267,268 | B2 * | 9/2012 | Friedlmeier | F17C 5/06 220/4.12 |
| 9,802,480 | B2 * | 10/2017 | Komiya | F17C 13/04 |
| 11,079,068 | B2 * | 8/2021 | Jayaraman | F17C 5/06 |
| 2003/0037911 | A1 * | 2/2003 | Halse | F17C 13/00 165/110 |
| 2014/0352817 | A1 * | 12/2014 | Suzuki | F17C 13/04 137/550 |
| 2019/0170260 | A1 * | 6/2019 | Hausmann | F17C 13/04 |
| 2025/0383046 | A1 * | 12/2025 | Suh | F17C 5/00 |

* cited by examiner

[Fig. 1]
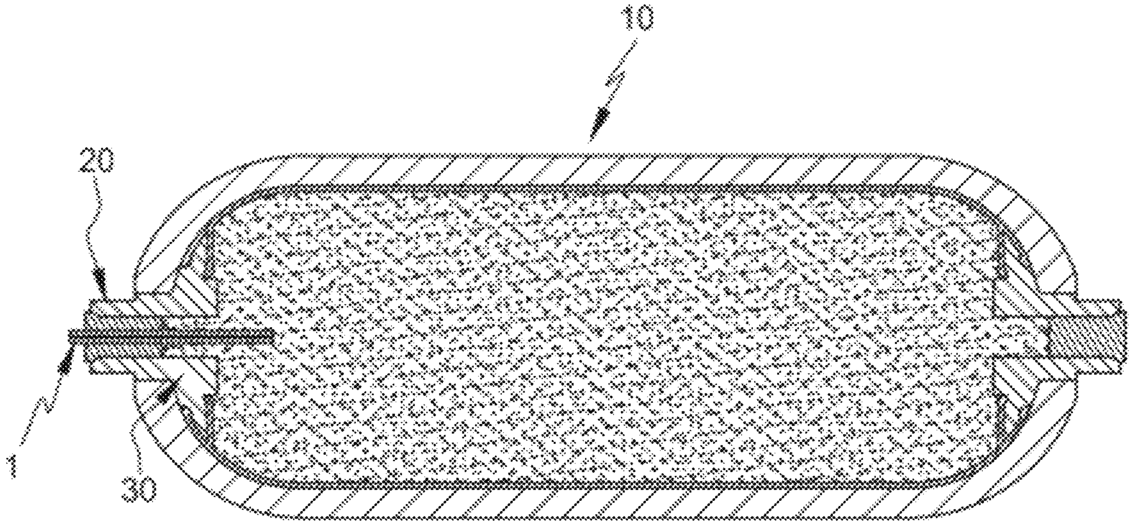
[Fig. 2]
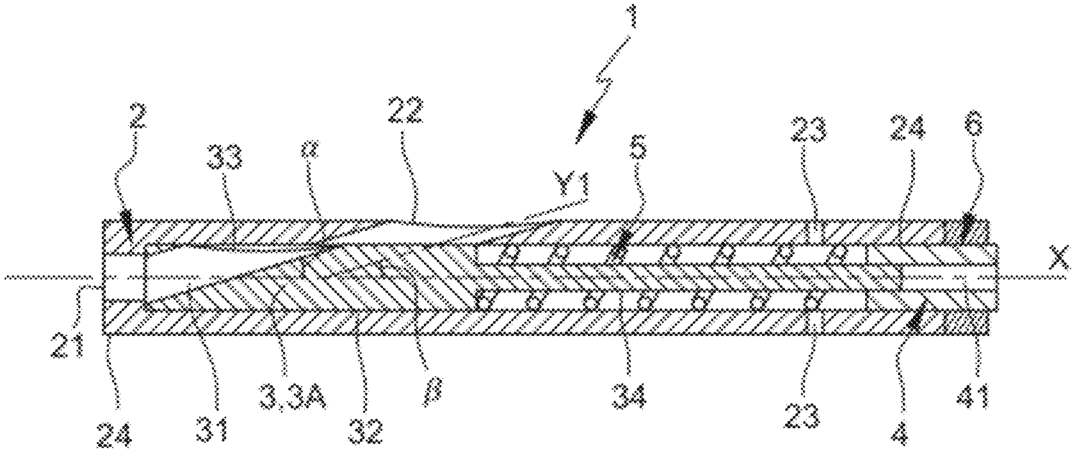

[Fig. 3]
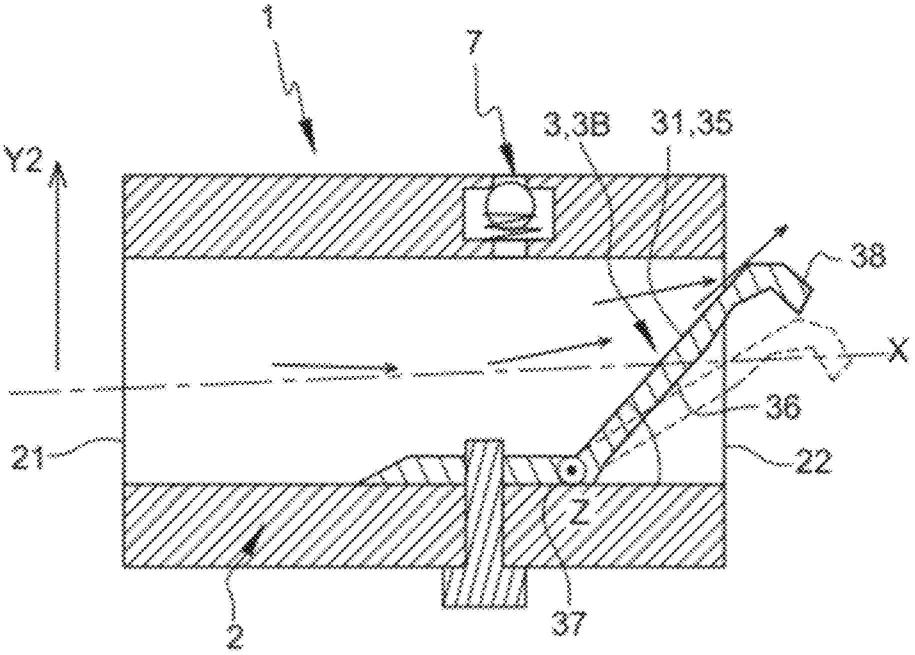

INJECTOR FOR A GAS RESERVOIR, AND RESERVOIR EQUIPPED WITH SUCH AN INJECTOR

CROSS-REFERENCE TO RELATED APPLICATIONS

This application claims the benefit of priority under 35 U.S.C. § 119(a) and (b) to French patent application No. FR 2400140, filed Jan. 8, 2024, the entire contents of which are incorporated herein by reference.

BACKGROUND

Field of the Invention

The invention relates to an injector for a gas reservoir. The invention also relates to a gas reservoir equipped with such an injector.

Related Art

During the filling of gas reservoirs, in particular gaseous hydrogen reservoirs, the speed of the gas injected at the outlet of the injector, called injection speed, is responsible for good thermal homogenization of the gas in the reservoir: the higher the injection speed, the better the injected gas will mix the gas in the reservoir; and therefore the more thermally homogeneous the gas in the reservoir will be.

A thermally homogeneous gas is desirable in order to avoid hot spots that would risk damaging the walls of the reservoir. In particular, for composite reservoirs, a temperature of less than 85° C. is imposed by standard SAE J2601.

The gas reservoir is filled at a mass flow rate that must not exceed a certain level imposed by the standards. For example, the maximum mass flow rate is limited to 60 g/s for reservoirs of light vehicles. Moreover, the filling must be such that the temperature of the gas present in the reservoir does not exceed a certain threshold, set at 85° C. by standard SAE J2601.

Thus, for filling at a fixed mass flow rate, the injection speed will decrease proportionally with the increase in the density and pressure of the gas present in the reservoir. With this decrease in speed, the gas is no longer sufficiently mixed. This results in thermal gradients or thermal stratification in the reservoir, and a risk of hot spots appearing, having a temperature above the threshold set by the standard.

SUMMARY OF THE INVENTION

An object of the invention is to overcome the drawbacks listed above.

To this end, according to a first aspect, the invention relates to an injector for filling a gas reservoir, the injector comprising a duct intended to fluidically connect a gas station to the reservoir to be filled, the duct extending along a main axis and comprising an inlet orifice intended to receive a gas flow coming from the station and an outlet orifice intended to convey said flow towards the reservoir to be filled.

According to the invention, the injector comprises a mobile member configured to be in motion inside the duct, and relative to the outlet orifice, between a first extreme position in which the mobile member provides the outlet orifice with a minimum passage section, and a second extreme position in which the mobile member provides the outlet orifice with a maximum passage section.

Thus, by introducing a member that is able to move relative to the outlet orifice, the invention makes it possible to modify the passage section towards this outlet orifice. This makes it possible to keep the speed of injection of the gas into the reservoir at a sufficient level when the density of the gas increases in the reservoir. A sufficient level of speed is conducive to gas mixing in the reservoir, and consequently contributes to limiting the risk of hot spots appearing.

Other embodiments of the invention comprise the features below:

- the mobile member comprises a deflecting wall disposed facing the inlet orifice and forming an acute angle with the main axis of the duct;
- the mobile member comprises a slider that extends along the main axis of the duct;
- the slider is configured to be moved in translation in the duct along the main axis of the duct;
- the slider comprises a head provided with a channel;
- the channel comprises an internal surface forming at least part of the deflecting wall;
- the angle between the deflecting wall disposed facing the inlet orifice and the main axis of the duct is between 5 and 50°;
- the inlet orifice opens into the duct parallel to the main axis of the duct;
- the outlet orifice opens into the duct transverse to the main axis, for example in a direction forming an angle of between 5 and 50° with the main axis;
- the channel formed at the slider is configured to align at least partially with the outlet orifice of the duct so as to allow the gas to flow from the filling station to the reservoir to be filled;
- the injector comprises a support for mounting the slider in the duct;
- the support is configured to be fastened to one end of the duct, situated opposite the inlet orifice;
- the injector comprises an element for returning the slider to its first position;
- the injector comprises a member for alignment between the channel formed on the slider and the outlet orifice of the duct;
- the alignment member is positioned around the support and in abutment against one end of the duct;
- the duct comprises at least one vent opening situated downstream of the outlet orifice;
- the duct is provided with a stop intended to limit the travel of the slider towards the inlet orifice of the duct in its first position;
- the stop is situated at a threshold of the inlet orifice of the duct;
- the mobile member comprises a tongue disposed inside the duct, obliquely with respect to the main axis;
- the tongue is configured to be moved by bending about an axis perpendicular to the main axis of the duct;
- the tongue has a first edge fastened to an internal wall of the duct and a free edge that emerges into the outlet orifice;
- the free edge of the tongue is configured to be moved relative to the outlet orifice, in translation in a direction perpendicular to the main axis, and/or in rotation about the bending axis of the tongue;
- the inlet orifice and the outlet orifice each have the shape of a passage having an axis that is coincident with the main axis of the duct.

According to a second aspect, the invention relates to a reservoir comprising an injector according to any one of the embodiments described above.

BRIEF DESCRIPTION OF THE FIGURES

Further particular features and advantages will become apparent upon reading the following description, which is provided with reference to the following figures, in which:

FIG. 1 is a schematic view illustrating an example of a reservoir equipped with an injector according to the invention.

FIG. 2 is a schematic view in cross section illustrating the injector according to a first embodiment of the invention.

FIG. 3 is a schematic view in cross section illustrating the injector according to a second embodiment of the invention.

DETAILED DESCRIPTION OF THE INVENTION

As illustrated in FIG. 1, the invention relates to a reservoir 10 comprising an injector 1. The injector 1 is disposed at a neck 20 of the reservoir 10. Furthermore, the injector 1 is held in position at the neck 20 by virtue of a support 30.

With reference to FIG. 2 and FIG. 3, the injector 1 comprises a duct 2 intended to fluidically connect the station 100 to the reservoir to be filled 10. In particular, the duct 2 extends along a main axis X and comprises an inlet orifice 21 intended to receive a gas flow coming from the station 100, and an outlet orifice 22 intended to convey said flow towards the reservoir to be filled 10.

According to the invention, the injector 1 comprises a member 3 that is able to move inside the duct 2 and configured to occupy the following extreme positions with respect to the outlet orifice 22: a first position in which the mobile member 3 provides the outlet orifice 22 with a minimum passage section, and a second position in which the mobile member 3 provides the outlet orifice 22 with a maximum passage section. In other words, the mobile member 3 makes it possible to modify (and in particular to reduce) the passage section towards the outlet orifice 22.

Advantageously, the mobile member 3 comprises a deflecting wall 31 disposed facing the inlet orifice 21. The deflecting wall 31 forms an angle $\alpha$ of between 5 and 50° with the main axis X of the duct 2. The deflecting wall 31 of the mobile member 3 makes it possible to deflect the trajectory of the flow of the gas coming from the inlet orifice 21.

Reducing the passage section towards the outlet orifice 22 in combination with deflecting the trajectory of the gas flow makes it possible to keep at a sufficient level and/or to increase the speed of injection of the gas at the outlet orifice 22 of the injector. By virtue of the control of the injection speed, the gas flow injected into the reservoir to be filled 10 mixes the gas present in said reservoir, thus preventing the formation of hot spots in said reservoir.

In a first embodiment, illustrated in FIG. 2, the member 3 comprises a slider 3A that extends along the main axis X of the duct 2. The slider 3A is configured to be moved in translation in the duct 2 along the main axis X of the duct 2.

According to this first embodiment, the slider 3A comprises a head 32 that is provided with a channel 33 forming an angle $\alpha$ of between 5 and 50° with the main axis X of the duct 2. The slider 3A also comprises a guide 34 that is connected to the head 32. In particular, the head 32 has a diameter close to an inside diameter of the duct 2. The guide 34 is in the form of a prism of hexagonal, square or rectangular section.

Moreover, the inlet orifice 21 of the duct 2 has an axis that is coincident with the main axis X of the duct 2. The outlet orifice 22 of the duct 2 has an axis Y1 that forms an angle $\beta$ of between 5 and 50° with the main axis X of the duct.

Thus, the passage 33 formed at the slider 3A is configured to align with the outlet orifice 22 of the duct 2 in order to ensure the gas flows from the station 100 to the reservoir to be filled 10. The passage 33 formed at the slider 3A comprises an internal wall that forms the deflecting wall 31.

Advantageously, the injector 1 comprises a support 4 allowing the slider 3A to be mounted in the duct 2. In particular, the support 4 is fastened to one end 24 of the duct 2, opposite the inlet orifice 21 of the duct 2. Furthermore, the support 4 comprises a passage 41 configured to receive the guide 34. The passage 41 has a geometry complementary to that of the guide 34, i.e. a section of hexagonal, square or rectangular shape.

Thus, the support 4 prevents any rotation of the slider 3A relative to the duct 2.

In the example illustrated, the support 4 comprises a threaded cylinder that cooperates by screwing with the duct 2. As a variant, other fastening methods can be envisaged between the support 4 and the duct 2.

Advantageously, the injector 1 comprises an elastic return element 5 connecting the slider 3A to the support 4.

In the example illustrated, the return element 5 is a spring that is disposed around the guide 34 of the slider 3A, between the head 32 of the slider 3A and the support 4. More specifically, the spring 5 has a first turn fastened to the head 32 of the slider 3A and a second turn fastened to the support 4.

Advantageously, the injector 1 comprises an alignment member 6 making it possible to align the channel 33 formed on the slider 3A and the outlet orifice 22 of the duct 2. The alignment member 6 is positioned around the support 4 and in abutment against the end 24 of the duct 2. The alignment member 6 thus makes it possible to block the position of the support 4 with respect to the duct 2.

In the example illustrated, the alignment member 6 is a nut of hexagonal, square or rectangular section.

In the nominal position, the head 32 of the slider 3A is pressed against a stop 24 of the duct 2. The channel 33 formed at the head 32 of the slider 3A is offset with respect to the outlet orifice 22 in the main direction X of the duct, leaving a minimum passage section towards the outlet orifice 22.

When the gas is admitted into the injector 1, its pressure drives the slider 3A towards the support 4, thus making it possible to completely free up the outlet orifice 22. In the reservoir to be filled 10, the density of the gas is low and the pressure difference with respect to the injected gas flow is relatively high. The gas flows at sufficient speed from the injector to the reservoir 10.

Then, as the injection continues, the density of the gas in the reservoir 10 increases for one and the same mass flow rate delivered by the injector 1. Thus, the volumetric input decreases, as does the pressure difference with respect to the injected gas flow.

The slider 3A is then driven in a reverse movement from the support 4 towards the stop 24 of the duct. The return of the slider 3A to its nominal position reduces the passage section of the outlet orifice 22 and makes it possible to maintain the injection speed of the gas injected into the reservoir 10.

The return of the slider 3A to its nominal position is made possible by virtue of the return element 5.

It should be noted that, in this embodiment, the duct 2 comprises at least one vent opening 23 situated downstream of the outlet orifice 22 and upstream of the support 4.

The vent opening 23 serves to prevent trapping of the gas situated between the slider 3A and the support 4. Furthermore, the vent opening 23 allows the gas to pass between the duct 2 and the inside of the reservoir 10, in order to balance the pressures. Thus, by virtue of the presence of the vent opening 23, the slider 3A can move freely in the duct 2.

In another embodiment, illustrated in FIG. 3, the mobile member 3 comprises a deformable tongue 3B that is fastened obliquely inside the duct 2.

The tongue 3B has two opposite faces, including a first face 35 disposed facing the inlet orifice 21, and a second face 36 disposed facing the outlet orifice 22. The first face 35 forms the deflecting wall 31 of the tongue 3B.

Furthermore, the tongue 3B has a first edge 37 fastened to an internal wall of the duct 2 and a free edge 38 that emerges into the outlet orifice 22. The free edge 38 of the tongue 3B is configured to move relative to the outlet orifice 22 of the duct 2 in a forwards-and-back translation in a direction Y2 perpendicular to the main axis X of the duct 2. Thus, the translation of the free edge 38 makes it possible to reversibly modify the passage section of the outlet orifice 22.

The translation of the free edge 38 in the forward direction is obtained following bending of the tongue 3B about the first edge 37 and about a direction Z perpendicular to the main axis X of the duct 2. The bending is induced by a force of the gas passing through the injector. The translation of the free edge 38 in the back direction is obtained by elastic return of the tongue 3B to a nominal configuration (i.e. a configuration in the absence of gas in the injector 1 or when the force induced by the gas is relatively small).

In other words, the tongue 3B is configured to be deformed by bending and pass reversibly from a first configuration in which the tongue 3B and the internal wall of the duct 2 provide the outlet orifice 22 with a minimum passage section, and a second configuration in which the tongue 3B and the internal wall of the duct 2 provide the outlet orifice 22 with a maximum passage section.

In particular, in its first configuration, the tongue 3B forms a minimum angle $\alpha$ with the main axis X of the duct 2. In its second configuration, the tongue 3B forms a maximum angle $\alpha$ with the main axis X of the duct 2.

Advantageously, the duct 2 is equipped with a non-return valve 7. Thus, during the emptying of the reservoir, a gas flow can circulate in the reservoir 10 towards the injector 1 even if the tongue 3B is pushed too far towards the duct 2, obstructing the minimum passage section of the outlet orifice 22.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. An injector for a gas reservoir, the injector comprising a duct configured to fluidically connect a filling station and the reservoir to be filled, the duct extending along a main axis and comprising an inlet orifice configured to receive a pressurized gas flow coming from the filling station and an outlet orifice configured to convey said flow towards the reservoir to be filled, the injector also comprising a mobile member disposed inside the duct and configured to move relative to the outlet orifice, between a first extreme position in which the mobile member provides the outlet orifice with a minimum passage section, and a second extreme position in which the mobile member provides the outlet orifice with a maximum passage section, wherein the mobile member comprises a deflecting wall disposed facing the inlet orifice and forming an acute angle ($\alpha$) with the main axis of the duct.

2. The injector according to claim 1, wherein the mobile member comprises a slider that extends along the main axis of the duct, the slider being configured to be moved in translation in the duct along the main axis of the duct.

3. The injector according to claim 2, wherein the slider comprises a head provided with a channel, the channel comprising an internal surface forming at least part of the deflecting wall, the angle ($\alpha$) being between 5 and 50°.

4. The injector according to claim 2, further comprising a support for mounting the slider in the duct, the support being configured to be fastened to one end of the duct, situated opposite the inlet orifice.

5. The injector according to claim 4, further comprising an element for returning the slider to the first position.

6. The injector according to claim 4, further comprising a member for alignment between the channel formed on the slider and the outlet orifice of the duct, the alignment member being positioned around the support and in abutment against one end of the duct.

7. The injector according to claim 2, wherein the duct is provided with a stop configured to limit the travel of the slider towards the inlet orifice of the duct in the first position, the stop being situated at a threshold of the inlet orifice of the duct.

8. The injector according to claim 1, wherein the inlet orifice opens into the duct parallel to the main axis of the duct, and in that the outlet orifice opens into the duct transverse to the main axis thereby forming an angle (β) of between 5 and 50° with the main axis.

9. The injector according to claim 1, wherein the duct comprises at least one vent opening situated downstream of the outlet orifice.

10. The injector according to claim 1, wherein the mobile member comprises a tongue disposed inside the duct, obliquely with respect to the main axis, the tongue being configured to be moved by bending about an axis perpendicular to the main axis of the duct.

11. The injector according to claim 10, wherein the tongue has a first edge fastened to an internal wall of the duct and a free edge that emerges into the outlet orifice, the free edge being configured to be moved relative to the outlet orifice in translation in a direction perpendicular to the main axis, and/or in rotation about the axis.

12. The injector according to claim 11, wherein the inlet orifice and the outlet orifice each have the shape of a passage having an axis that is coincident with the main axis of the duct.

13. A reservoir comprising an injector according to claim 1.

* * * * *